Un*ited States Patent Office 3,517,805
Patented June 30, 1970

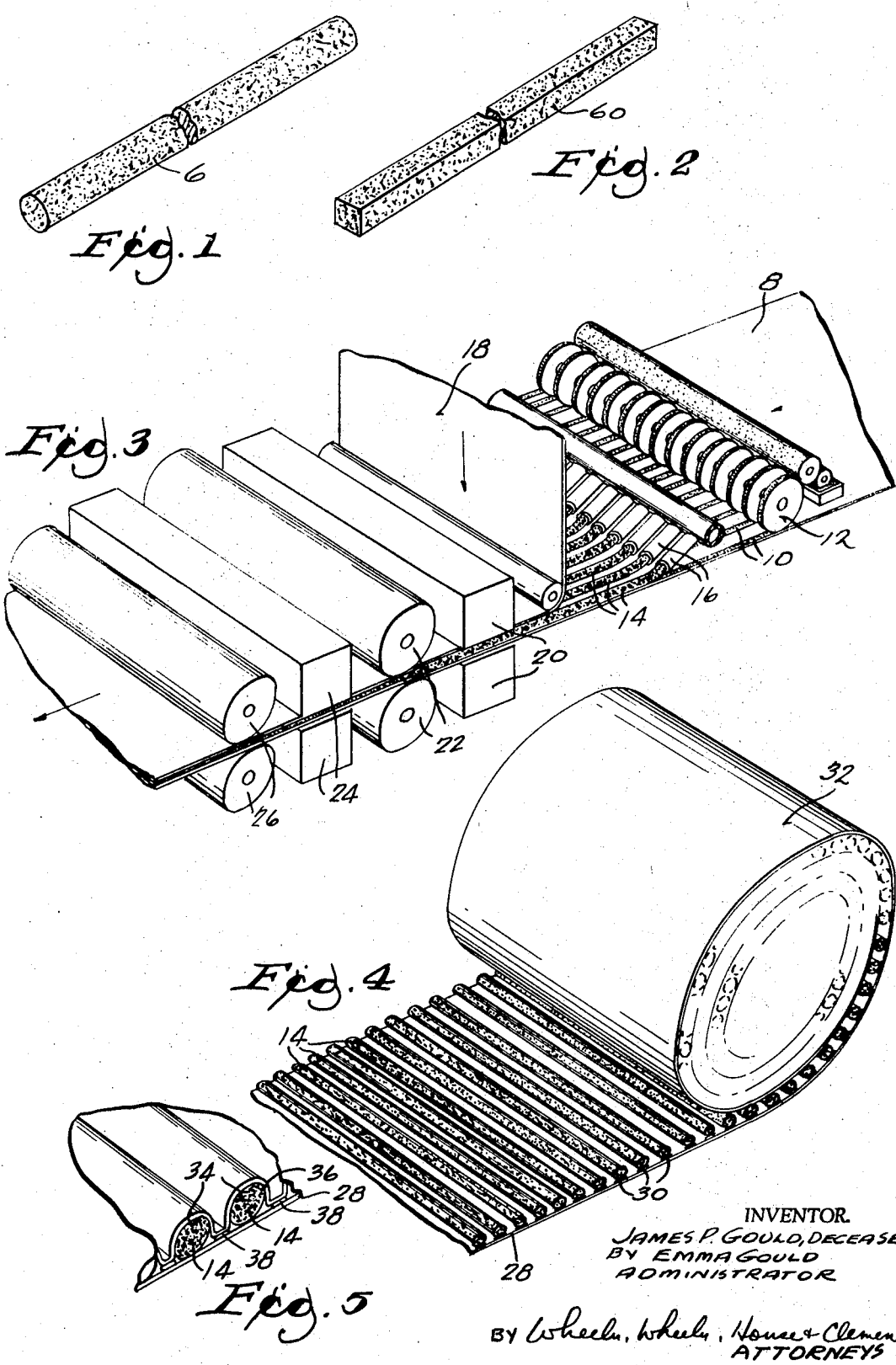

3,517,805
MOLDABLE RESIN-BONDED LAMINATE
James P. Gould, deceased, late of New York, N.Y., by Emma Gould, administrator, Allerton House, 130 E. 57th St., New York, N.Y. 10022
Filed Feb. 7, 1968, Ser. No. 703,796
Int. Cl. B65h 75/00
U.S. Cl. 206—59                                                7 Claims

ABSTRACT OF THE DISCLOSURE

For use in the production of resin-bonded laminates, an elongated body consists of particles of thermosetting resin, preferably in B-stage, and bonded by a thermoplastic resin which melts at temperature below that at which the polymerization of the thermosetting resin will be completed, whereby application of pressure and heat first permits the adhesive to spread under pressure and then complete polymerization of the thermosetting component sufficiently to provide permanent union between upper and lower plies, one of which may comprise a carrier designed to become a part of the laminate.

REFERENCE TO RELATED APPLICATION

The present application is a continuation-in-part of application of the late James P. Gould, Ser. No. 379,172, filed June 30, 1964 now abandoned.

A major problem in the manufacture of laminates is to position adhesive and filler between laminae during handling, assembly, and lamination.

The present invention contemplates prefabrication of an elongated body comprising a composition containing both the filler and the adhesive in easily handled form. It is further contemplated that bodies thus made in appropriate dimensions, and preferably using a thermosetting resin as at least a major part of its adhesive content, will be attached adhesively in predetermined pattern to one of the laminae to constitute an article of manufacture which may be sold, preferably in the form of a roll, to the fabricator who is to complete the lamination. Alternatively, the whole laminating operation can be performed in one continuous operation, if desired.

The stick or rod of the present invention is preferably made by extrusion to include as a major ingredient wood flour or other appropriate filler homogeneously mixed with a thermosetting resin to be used in the laminating process and further containing a compatible adhesive such as thermoplastic resin to maintain the wood flour and the thermosetting resin in assembly pending use. The thermoplastic should have a melt point materially below the set up temperature of the thermosetting plastic so that the product will "flow" under press pressure and temperature to distribute itself in the work.

It is contemplated that after the ingredients are thoroughly mixed, they will be extruded to make the stick or rod of the present invention. The components and their proportions will be varied according to requirements. A typical formula comprises about eighty percent by weight of wood flour with about fifteen percent of discrete particles or pellets of a thermosetting resin such as a melamine, phenol, or urea formaldehyde molding resin formulated to set up at approximately 250° F. and five percent of almost any intermediate thermoplastic resin which softens in the general range of about 150° F. Thermoplastic resins useful in the practice of this invention include: ethylene polymers such as low density polyethylene, ethylene-vinyl acetate copolymers and ethylene-ethyl acrylate copolymers; phenoxy resins; polyurethane elastomers; styrene-butadiene thermoplastic elastomers; cellulosic plastics such as cellulose acetate and ethyl cellulose; and acrylic resins such as polymethylmethacrylate and methylmethacrylate-styrene copolymers; and mixtures of two or more of the foregoing. Many of the foregoing examples soften around 150° F. Others soften up to 200° F. This is not critical as long as softening occurs to permit distribution of the composition before the thermosetting resin sets. The form in which the thermoplastic resin is incorporated in the mix is also subject to wide variation. It may be incorporated in a liquid or it may be sprayed upon the mixture of filler and thermosetting resin particles or it may even be incorporated in dry particulate form and softened by heat during extrusion to effect the desired bond between the particles of filler and thermosetting resin.

The stick or rod so made can be adhered to one of the laminae either by softening the thermosetting component of the stick or rod or, more desirably, by providing an adhesive stripe or coating on the lamina. As examples, the following application discloses a continuous process in which one of the laminae is longitudinally striped with adhesive as it passes beneath extruding nozzles from which the sticks or rods are issuing continuously in registry with the stripes, another lamina thereupon being superimposed and the assembly being completed in one continuous operation by heat and pressure sufficient to soften the thermoplastic and to cause the material of the sticks or rods to spread and distribute itself throughout the area between the laminae. Progressive increase in temperature thereupon causes the set of the thermosetting component to complete the laminate. Proper choice of dimensions and spacing of the rods or sticks will result in substantially perfect distribution of the wood flour, which will flow under the laminating heat and pressure to fill all imperfections in the work and to provide a uniform product.

In another embodiment, I have disclosed a mid-product saleable as an article of manufacture and comprising a roll of one of the laminae, which may comprise a film or pattern paper, phenol-impregnated, and transversely striped with adhesive on one of its surfaces to position closely spaced transversely extending sticks or rods of a composition as aforesaid. These adhere to the surface and are wound into the roll.

In still another embodiment, I have disclosed as a mid-product, saleable as an article of manufacture, a roll which comprises a plurality of laminae in super-imposed webs transversely joined by hot-melt adhesive on closely spaced lines to form pockets in which the sticks or rods are encased, the whole fusing in the ultimate laminate made therefrom.

In the drawings:
FIG. 1 shows a stick or rod embodying the invention.
FIG. 2 is a fragmentary detail view of a stick or rod of different cross section.
FIG. 3 is a diagrammatic view in perspective showing assembly of laminates and sticks or rods in a continuous operation.
FIG. 4 is a detail view in perspective showing a roll comprising a lamina and sticks or rods bonded thereto for the assembly of such lamina to another lamina or laminae.
FIG. 5 is a fragmentary detail view showing a modified and preferred construction to be used in the mid-product shown in FIG. 4.

The extruded rod 6 may be sold and used as such for the production of laminates, and for other purposes. It comprises in unitary and readily handled form and in any cross section a homogeneous mixture of a thermosetting resin with a filler, these materials being bonded by a thermoplastic resin having a melt point sufficiently low so that the thermosetting resin and filler will distribute themselves under molding heat and pressure before the thermosetting resin sets up in the laminate. Some indication of appropriate materials has already been given. The range is so wide as to make further specific examples unnecessary.

The form of the body of filler and the thermosetting resin is immaterial. It is preferably an elongated rod. In the showing of FIG. 1, the rod is round in cross section. In the showing of FIG. 2, the rod 60 is rectangular or square in cross section. The rod may be of any appropriate length which permits of handling. The cross section will depend on various requirements such as the contour or irregularities of a lamina with which it is to be used. A typical rod might be five-sixteenths of an inch in cross section.

The rods may be assembled individually to the laminae, or in a continuous flow laminating operation, or otherwise. FIG. 3 diagrammatically shows a continuous operation in which the lamina 8 is a web on which stripes 10 of adhesive are roller-coated by means of conventional disk applicators 12. By way of example, and not by way of limitation, these disks might be one-eighth to one-quarter inch in width. Onto the adhesive stripes 10 the continuous rods, here designated by reference character 14, are delivered directly from the extruding nozzle 16 to be held in position temporarily by the adhesive stripes 10.

Over the lamina 8 and the rods 14 is superimposed a lamina 18 in web form and a composite assembly of laminae and thermosetting resin and filler passes through whatever process is needed to complete the laminating operation. By way of example, I have illustrated a preheating oven at 20, conventional press rolls at 22, and such additional ovens and rolls 24 and 26 as are required, to maintain the heat and pressure until the thermosetting resin has set to complete the lamination.

While I have described the use of my extruded rods in a continuous laminating operation, it is visualized that the principal use of these rods will be concerned with the mid-product assemblies shown in FIGS. 4 and 5. In the disclosure of FIG. 4, a web 28 which will ultimately be one of the laminae of a laminated assembly, and may be visualized as comprising the pattern sheet or top ply of such an assembly is provided with transverse hot-melt adhesive stripes 30 extending transversely of the web and serving to connect the rods 14 temporarily to the upper surface of the web for unitary handling. The rods extend transversely and are closely spaced from each other in a direction longitudinally of the web. Spacing is determined by the amount of filler required. Upon completion of such a length of web material, the web and attached rods can be wound into a roll such as shown at 32.

The preferred construction is that of FIG. 5 in which the individual rods 14 are not directly adhered to the web but are confined within pockets 34 which are formed in a compatible plastic film 36. With the rods 14 superimposed on the web 28, the film 36 is laid over the rod and adhered thereto by pressing into engagement with lines 38 of hot-melt adhesive those portions of the film which intervene between the rods. Thereby the pockets 34 are formed and the rods confined in position on the web 28. The positioning of the rods is obviously much more secure when they are thus confined instead of being individually adhered to the supporting web. It is contemplated that the resulting web will be rolled as shown at 32 in FIG. 4 and handled and sold as such.

In the use of this product in making a laminate, a given length cut from the roll will be associated with one or more additional laminae in an ordinary laminating press to be subjected to heat and pressure in the usual way. The hot-melt adhesive of the stripes 38, the thermoplastic sheeting 36, and the thermoplastic adhesive component of the rods 14, will all soften in advance of the setting of the thermosetting resin to permit the thermosetting resin and wood flour or other extender to flow, under the heat and pressure of the press to distribute themselves throughout the finished product.

What is claimed is:

1. A product adapted for use in the molding of a laminate to provide unitarily a dent-resistant filler maintained in proper distribution during normal handling, said product comprising a flexible web having upon a face thereof substantially uniformly distributed bodies, each of which comprises a homogeneous mixture of a thermosetting resin and a filler, and adhesive means for bonding the thermosetting resin and filler to maintain the form of said bodies, said product including means for fastening said bodies on the web.

2. A product according to claim 1 in which the filler and thermosetting resin comprise discrete solid particles, the thermosetting resin having a predetermined set up temperature, the adhesive means comprising a thermoplastic having a softening temperature materially lower than the set up temperature of the thermosetting resin.

3. A product according to claim 1 in which said web and thermosetting resin, filler, and adhesive means and fastening means are adapted to fill, fuse and mold to constitute a part of the ultimate laminate.

4. The product of claim 1 in which the web is elongated and said bodies have the form of substantially rectilinear rods extending transversely of the web and of small cross section in relation to their length.

5. The product of claim 1 in which the said web with attached bodies is wound into a roll.

6. A product according to claim 3 in which the means for fastening the bodies to the web comprises a second web connected to the first mentioned web between said bodies and forming pockets in which said bodies are disposed.

7. A product according to claim 3 in which the web has stripes of adhesive with which the respective bodies are directly adhered to connect them to the web.

References Cited

UNITED STATES PATENTS

| 2,247,252 | 6/1941 | Price | 161—116 |
|---|---|---|---|
| 2,282,168 | 5/1942 | Cunnington | 161—132 |
| 2,340,116 | 1/1944 | Ferguson et al. | |
| 2,510,727 | 6/1950 | Sussenbach. | |
| 3,309,444 | 3/1967 | Schueler | 264—122 X |

ROBERT F. BURNETT, Primary Examiner

R. O. LINKER, JR., Assistant Examiner

U.S. Cl. X.R.

161—143, 121; 264—122, 126